United States Patent
della Porta et al.

(10) Patent No.: US 6,682,817 B1
(45) Date of Patent: Jan. 27, 2004

(54) COMPOSITE MATERIALS CAPABLE OF HYDROGEN SORPTION COMPRISING PALLADIUM AND METHODS FOR THE PRODUCTION THEREOF

(75) Inventors: Paolo della Porta, Carimate (IT); Claudio Boffito, Rho (IT); Luca Toia, Busto Arsizio (IT)

(73) Assignee: SAES Getters S.p.A., Lainate (IT)

( * ) Notice: Subject to any disclaimer, the term of this patent is extended or adjusted under 35 U.S.C. 154(b) by 0 days.

(21) Appl. No.: 09/586,401

(22) Filed: Jun. 2, 2000

(30) Foreign Application Priority Data

Jun. 2, 1999 (IT) .............................. MI99A1241
Mar. 9, 2000 (IT) ..................... MI2000A0475

(51) Int. Cl.$^7$ ................................................. B32B 5/16
(52) U.S. Cl. ....................... 428/403; 428/548; 428/570
(58) Field of Search ................................. 428/403, 548, 428/570

(56) References Cited

U.S. PATENT DOCUMENTS

| | | | |
|---|---|---|---|
| 3,203,901 A | | 8/1965 | della Porta |
| 3,963,826 A | * | 6/1976 | Anderson et al. |
| 4,071,335 A | | 1/1978 | Barosi |
| 4,306,887 A | | 12/1981 | Barosi et al. |
| 4,312,669 A | | 1/1982 | Boffito et al. |
| 4,457,891 A | | 7/1984 | Bernauer et al. |
| 4,668,424 A | | 5/1987 | Sandrock |
| 4,839,085 A | | 6/1989 | Sandrock et al. |
| RE35,725 E | * | 2/1998 | Briesacher et al. |
| 5,882,727 A | | 3/1999 | Corazza et al. |
| 5,961,750 A | * | 10/1999 | Boffito et al. |
| 6,013,195 A | * | 1/2000 | Corazza et al. |
| 6,069,111 A | * | 5/2000 | Yamamoto et al. |
| 6,074,973 A | * | 6/2000 | Lampert et al. |
| 6,110,807 A | * | 8/2000 | Conte et al. |
| 6,322,720 B1 | * | 11/2001 | Reutova et al. |
| 6,423,575 B1 | * | 7/2002 | Tran et al. |
| 6,521,014 B2 | * | 2/2003 | Toia et al. |

FOREIGN PATENT DOCUMENTS

| | | |
|---|---|---|
| EP | 0291123 A1 | 11/1988 |
| EP | 0291123 A | 11/1988 |
| EP | 0869195 A1 | 7/1998 |
| EP | 0716772 B1 | 1/1999 |
| FR | 2760089 | 8/1998 |
| GB | 14052/72 | 12/1973 |
| JP | 02325486 | 7/1992 |
| SU | 1141920 | 8/1985 |
| WO | WO 93/25843 | 12/1993 |
| WO | WO 98/25843 | 12/1993 |
| WO | WO 98/37958 | 9/1998 |
| WO | WO 98.37958 | 9/1998 |

OTHER PUBLICATIONS

Long Life Metal Vapour Discharge Lamp Having Hydrogen Getter of Zirconium Alloy Coated with Palladium, Aug. 31, 1977, Derwen Publications Ltd., London, GB.

Vacuum Technology Non Spray Gas Absorb Active Material Protect Hydrogen Permeable Shell from Thing Film Palladium, Aug. 30, 1985, Derwent Publications Ltd., London, GB.

* cited by examiner

Primary Examiner—H. Thi Le
(74) Attorney, Agent, or Firm—Perkins Coie LLP; Paul L. Hickman; David Bogart Dort

(57) ABSTRACT

A powder of a composite material comprising a non-evaporable getter material with a palladium coating continuously sorbs hydrogen. Embodiments in which the coverage of the palladium coating over the particles of the NEG material is complete can sorb hydrogen without the need for an activation treatment. Other embodiments in which the palladium coverage is less than total but greater than about 10% can also sorb gaseous species other than hydrogen. Loose powders, pressed powders, and sintered powders of the composite material are incorporated into getter devices and into the evacuated spaces of double-walled pipes, dewars, and thermal bottles. Methods for preparing powders of these composite materials utilize evaporative, sputter, and CVD deposition techniques. Another method prepares powders of the composite material by a liquid phase impregnation process.

9 Claims, 3 Drawing Sheets

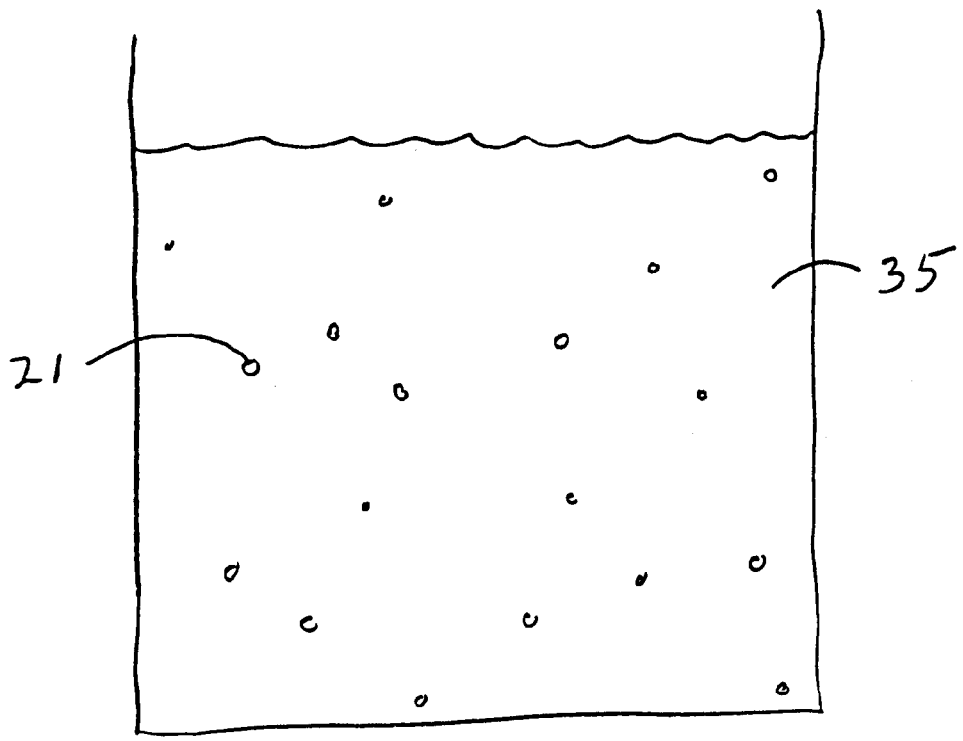

COMPOSITE MATERIALS CAPABLE OF HYDROGEN SORPTION COMPRISING PALLADIUM AND METHODS FOR THE PRODUCTION THEREOF

CLAIM OF FOREIGN PRIORITY PURSUANT TO 35 U.S.C. §119

This application claims foreign priority under 35 U.S.C. §119 from both Italian Patent Application Serial Number MI99A 001241 filed Jun. 6, 1999, and Italian Patent Application Serial Number MI2000A 000475 filed Mar. 9, 2000, both of which are incorporated herein by reference for all purposes.

BACKGROUND OF THE INVENTION

1. The Field of the Invention

The present invention relates to composite materials capable of selectively sorbing hydrogen without requiring an activation treatment, and to composite materials capable of sorbing hydrogen as well as other gases. The present invention also refers to methods for the production of such materials.

2. Background

In many technologically advanced applications gas sorption is achieved with non-evaporable getter (NEG) materials. NEG materials are most frequently found in two types of applications in particular. In the first type of application a NEG material is used to purify a gas stream by sorbing unwanted species. For example, in the semiconductor industry bothersome species such as hydrogen, oxygen, nitrogen, water, oxides of carbon, and oxides of nitrogen are removed from noble gas streams. Similarly, gases used in the manufacture of certain gas-filled devices such as light bulbs are similarly purified to provide advantages such as improve filament lifetimes.

In the second type of application a NEG material is used to maintain a high degree of vacuum within a sealed enclosure. Processing chambers are common examples of such enclosures in the semiconductor industry. Beyond the semiconductor industry such enclosures can be found in thermal insulation devices such as thermal bottles, dewars, and insulated pipes for oil extraction and for oil transport in arctic and undersea regions. Sealed enclosures for these applications typically consist of an inner wall and an outer wall with an evacuated volume maintained between the two walls. For oil extraction and transport it is frequently necessary to use insulated pipes in order to prevent excessive cooling of the fluid. Such cooling can cause the heavier components of the oil to solidify with a resulting increase in the total viscosity thereof, potentially creating a blockage.

NEG materials include metals such as zirconium and titanium and alloys based on these metals. Such alloys can include one or more other elements selected from amongst the transition metals and aluminum. NEG materials have been the subject of several patents. U.S. Pat. No. 3,203,901 describes Zr—Al alloys, and particularly an alloy whose weight percent composition is Zr 84%—Al 16%, produced and sold by SAES Getters S.p.A., Lainate, Italy, under the name St 101®. U.S. Pat. No. 4,071,335 describes Zr—Ni alloys, and particularly an alloy whose weight composition is Zr 75.7%—Ni 24.3%, produced and sold by SAES Getters S.p.A., Lainate, Italy, under the name St 199™. U.S. Pat. No. 4,306,887 describes Zr—Fe alloys, and particularly an alloy whose weight composition is Zr 76.6%—Fe 23.4%, produced and sold by SAES Getters S.p.A., Lainate, Italy, under the name St 198™. U.S. Pat. No. 4,312,669 describes Zr—V—Fe alloys, and particularly an alloy whose weight percent composition is Zr 70%-V 24.6%—Fe 5.4%, produced and sold under the name St 707®. U.S. Pat. No. 4,668,424 describes Zr—Ni—A—M alloys, where A represents one or more rare earth elements, and M represents one or more elements selected from amongst cobalt, copper, iron, aluminum, tin, titanium, silicon. Patent application EP-A-869,195 describes Zr—Co—A alloys, where A is an element selected from amongst yttrium, lanthanum, the rare earth elements, and mixtures thereof. This patent application particularly discloses an alloy whose weight percent composition is Zr 80.8%—Co 14.2%-A 5%, produced and sold by SAES Getters S.p.A., Lainate, Italy, under the name St 787™. Finally, U.S. Pat. No. 4,457,891 describes Ti—Ni and Ti—V—Mn alloys.

Patent EP-B-291,123 describes the use in lamps of getter materials having Zr—Pd—O compositions, where the palladium is present in molar concentrations between 0.4% and 15% and the molar ratio between oxygen and zirconium is within the range 0.02–1.

The sorption of gases by NEG materials occurs in two steps. The first step is the superficial chemisorption of the gaseous species onto the surface of the NEG material, generally accompanied by the dissociation of the species into its constituent atoms. In the second step the constituent atoms diffuse into the bulk of the NEG material. In the case of hydrogen sorption, as hydrogen atoms spread inside the material they first form solid solutions, even at low temperatures. As the hydrogen concentration increases, hydrides such as $ZrH_2$ are formed. Therefore, the sorption capacity for hydrogen is high even at low temperatures.

This second step is different for elements such as oxygen, carbon and nitrogen. At relatively low temperatures (generally lower than about 300–500° C. according to the type of the NEG material) only superficial chemisorption occurs and surface layers of oxide, carbide or nitride compounds are formed. These layers effectively block bulk diffusion from occurring. At higher temperatures the oxygen, nitrogen and carbon atoms are able to diffuse into the NEG material, thus regenerating a clean surface for further gas sorption. Therefore, surface cleaning can be achieved continuously by constantly maintaining a NEG material at a sufficiently high temperature. Alternately, the surface of a NEG material maintained at a low temperature can be cleaned by periodically bringing it to a sufficiently high temperature. This latter process is commonly known as an activation treatment, and may be carried out at regular intervals or when a loss of sorption capacity is observed.

However, there are many applications for NEG materials in which the working temperature is at or below room and activation treatments are practically impossible. Such applications include maintaining high vacuum levels in sealed enclosures like those found in thermal bottles, fluorescent lamps, and the insulated pipes used in oil extraction and transport. Another important application of this kind is in batteries, both of the rechargeable kind such as Ni-metal hydride batteries, and of the non rechargeable kind, such as conventional alkaline batteries. As is well known in the art, batteries include an anode, a cathode, and an electrolyte disposed between them, all contained within a casing. Both alkaline and rechargeable batteries, under certain operating conditions, may release hydrogen causing the casing to swell and creating a risk of explosion.

In these low-temperature applications the sorption of relatively small quantities of oxygen, nitrogen or carbon produces a passivating layer on the surface of the NEG material, as previously described, which prevents further gas sorption and reduces the material's sorption capacity to a fraction of its theoretical value. Further, the passivating layer blocks hydrogen sorption which, as already explained, would otherwise occur to a high extent even at room temperature.

In some applications that employ NEG materials the presence of hydrogen can be especially harmful. In the case of thermal insulation applications, this is because hydrogen is the best thermal conductor amongst the various gases. Therefore, hydrogen in an evacuated volume, even in small quantities, notably worsens the thermal insulating property thereof. The presence of hydrogen in the gaseous filling mixture of lamps modifies the discharge conditions, and thus both prevents the lamp from functioning optimally and generally shortens its life. The presence of hydrogen is even more troublesome in the pipes used for oil extraction. In this application, acid solutions containing, for instance, hydrochloric acid, nitric acid, hydrofluoric acid, or mixtures thereof, are passed through the pipe in order to promote the disintegration of rocks wherefrom oil is extracted. However, these acids can cause corrosion of the pipes, forming microperforations and while generating large quantities of hydrogen. The hydrogen then may easily pass through the microperforations and into the surrounding evacuated volume, serious degrading its thermal insulation properties.

Improved hydrogen sorption by getter materials is the subject of international patent application WO 98/37958 and patent SU-A-1,141,920, which both describe coating NEG materials with palladium. According to these documents, the coating is performed by sputtering to obtain a continuous hydrogen-permeable film of palladium metal across the surface of the NEG material. In use, the getter material contacts an evacuated volume or a gas to be purified only through this continuous film. Further, getter devices created through the sputtering processes described in these documents can only be made in a planar configuration, which is not suitable for many possible applications. Additionally, the gas sorption capacity (i.e., the maximum gas quantity which can be sorbed) of these systems is low because of the lesser quantity of NEG material in the planar deposits. Lastly, the described devices are totally selective towards hydrogen sorption and cannot be used for the removal of other gaseous species.

It is an object of the present invention, therefore, to provide an improved composite material capable of continuous hydrogen sorption without a need for an activation treatment, as well as to provide a method for the production of such a material.

SUMMARY OF THE INVENTION

The present invention provides a composite material capable of continuously sorbing hydrogen without requiring an activation treatment. The composite material comprises a plurality of particles of a non-evaporable getter (NEG) material that are coated over at least about 10% of their surfaces with a deposit of one or more species selected from the group consisting of palladium, palladium oxide, palladium-silver alloys containing up to about 30% atomic percent silver, and compounds of palladium and the getter material. The NEG material particle size is less than about 500 µm, and more preferably between about 20 µm and about 125 µm, and the NEG material is selected from the group consisting of:

Zr, Ti, Nb, Ta, and V metals;

Zr alloyed with either Ti, Cr, Mn, Fe, Co, Ni, Al, Cu, Sn, Si, Y, La, any of the rare earth elements, or mixtures thereof;

Ti alloyed with either Zr, Cr, Mn, Fe, Co, Ni, Al, Cu, Sn, Si, Y, La, any of the rare earth elements, or mixtures thereof; and any mixture of the aforementioned metals and alloys.

The NEG material is more preferably selected from the group consisting of:

Ti—V alloys, Zr—V alloys, Zr—Al alloys, Zr—Fe alloys, Zr—Ni alloys, Ti—V—Mn alloys, Zr—Mn—Fe alloys, Zr—V—Fe alloys, Zr—Ni—A—M alloys, and Zr—Co—A alloys, where A indicates Y, La, any of the rare earth elements, or mixtures thereof, and M indicates Co, Cu, Fe, Al, Sn, Ti, Si, or mixtures thereof. A particular getter metal, alloy, or mixture thereof can be chosen for a particular service environment, for example, in order to maximize the hydrogen sorption capacity per unit volume. Alternately, a getter material can be selected for its ability to selectively sorb one or more unwanted gas species from the particular service environment. Or, a getter material can be selected for a desirably high melting point necessary to withstand the temperature of a service environment.

The palladium coating thickness is preferably less than about 5 µm and may cover as much as about 100% of the surfaces of the NEG particles. Complete coverage is desirable for those applications where only hydrogen needs to be sorbed. In those applications where one or more gas species other than hydrogen are sought to be sorbed, coverages between about 10% and about 90%, and more preferably between about 25% and about 75% of the particles' surfaces are coated with the palladium coating. The choice of a particular amount of coverage will include a balance of the need for hydrogen sorption against the need to sorb other gases from the particular service environment.

The composite materials of the present invention can be pressed and sintered to form pellets or other shapes. Pelletized powders can be more desirable for many applications where contamination control is important, and also can be easier to handle in manufacturing environments. The composite materials may also be deposited onto planar and non-planar substrates. Planar and non-planar substrates allow for devices of various geometries and applications, for example, ones having narrow tolerances. They also provide for devices where the quantity of NEG material is high, so that an increased hydrogen sorption capacity is obtained with respect to similar known devices. These materials may also be placed within the evacuated volumes of thermal insulation devices such as thermal bottles, insulated pipes, and dewars. Further, the materials can be used to create getter devices, for example, a container having an opening and filled with a powder of the composite material.

The present invention is also directed to several methods for the preparation of a composite material. In a liquid phase impregnation process a solution of a palladium compound in a solvent is prepared, a plurality of particles of a NEG material are mixed into the solution, the solvent is evaporated to create a dried powder, and the dried powder is thermally treated to leave a palladium coating on the particles. The palladium coating can be palladium metal, palladium oxide, or a mixture of the two. This method is particularly useful for creating uniform thicknesses and complete coverages of the NEG particles.

Other methods involve preparing a thin powder bed of a plurality of particles of a non-evaporable getter material, placing the thin powder bed into an evacuable chamber, evacuating the chamber, and forming a deposit on the particles. One of these methods is a CVD method in which a precursor compound containing palladium is evaporated within the chamber and deposits on the particles in the bed. The particles are then thermally treated to leave a palladium metal or oxide coating. The thermal treatment can also cause the palladium to react with the underlying NEG particle to create a coating that is a palladium compound with one or more of the elements from the NEG material. Another method is an evaporative method in which a wire of a palladium compound is heated within the chamber to cause a portion of the wire to evaporate and deposit on the NEG particles. A third method sputters a target of a palladium compound within the chamber to cause a portion of the target to deposit on the particles in the bed. These methods are particularly useful for creating partial coverages of the NEG particles. Agitating the powder bed during any of these processes can further increase the degree of coverage up to about 100%.

These and other aspects and advantages of the present invention will become more apparent when the detailed description below is read in conjunction with the accompanying drawings.

BRIEF DESCRIPTION OF THE DRAWINGS

The present invention will be readily understood by the following detailed description in conjunction with the accompanying drawings, with like reference numerals designating like elements.

FIG. 4 shows another embodiment of a method for coating NEG powders with palladium.

DETAILED DESCRIPTION OF THE PREFERRED EMBODIMENTS

Figure 1:
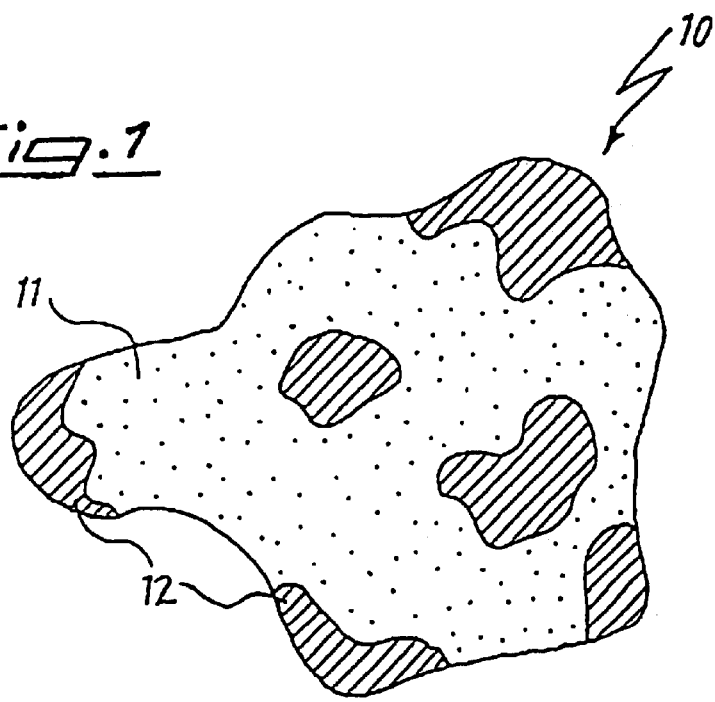
FIG. 1 shows a NEG powder grain having a partial palladium coating, according to an embodiment of the present invention.

FIG. 1 shows a composite material 10 according to the present invention. Composite material 10 includes a NEG powder grain 11 having a palladium coating 12. NEG powder grain 11 preferably has a particle size lower than about 500 $\mu$m, and even more preferably the particle size should be between about 20 $\mu$m and 125 $\mu$m. NEG materials which can be used for the present invention include all of the known ones including Zr, Ti, Nb, Ta, and V metals, alloys of these metals, and alloys of these metals that include one or more other elements selected from amongst Cr, Mn, Fe, Co, Ni, Al, Y, La and the rare earths. More preferable NEG materials include the binary alloys Ti—V, Zr—V, Zr—Al, Zr—Fe and Zr—Ni; the ternary alloys Ti—V—Mn, Zr—Mn—Fe and Zr—V—Fe; multicomponent alloys Zr—Ni—A—M and Zr—Co—A, where A is an element selected from amongst Y, La, the rare earths and mixtures thereof, and M is an element selected from amongst Co, Cu, Fe, Al, Sn, Ti, Si and mixtures thereof. Further, it is possible to use mixtures of any of the previously mentioned metals and alloys.

Palladium coating 12 is preferably palladium metal, palladium oxide, or a palladium-silver alloy containing up to 30 atomic percent silver. The palladium metal and palladium-silver alloys may be at least partially oxidized by any oxygen present during the deposition onto the NEG particles 11 or present in a service environment. Also, sufficient heating in a service environment or during deposition can cause metallic palladium or a palladium-silver alloy to interdiffuse with one or more metals within the underlying NEG particle 11. Such interdiffusion can form other alloys or intermetallic compounds along the interface between the coating 12 and the NEG particle 11. These species created along the interface can also be at least partially oxidized.

Figure 2:
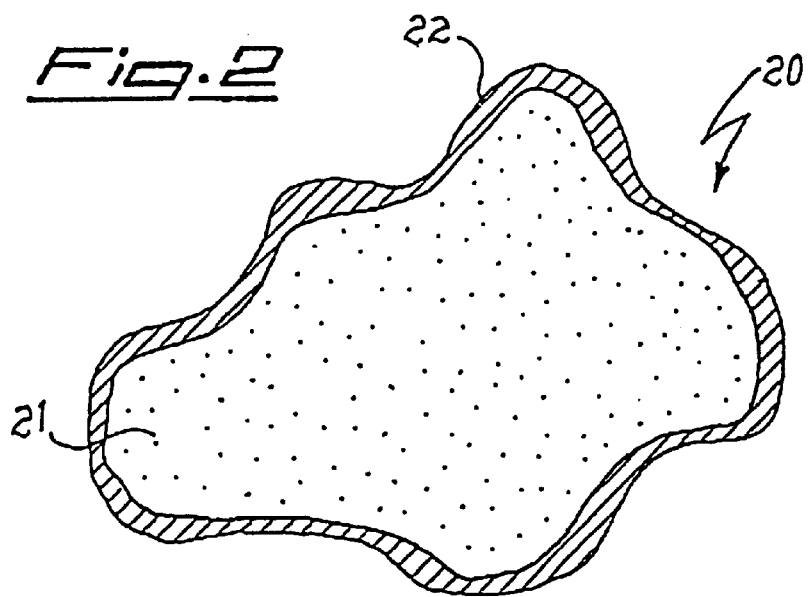
FIG. 2 shows a cross-section of a NEG powder grain having a complete palladium coating, according to another embodiment of the present invention.

Palladium coating 12 should cover at least about 10% of the surface area of NEG particle 11. The coverage is preferably about 100% for those applications where only hydrogen needs to be sorbed. A composite material 20 suitable for such applications is shown in FIG. 2. Composite material 20 includes NEG particle 21 and palladium coating 22 which covers about 100% of the surface of NEG particle 21. In other applications requiring the sorption of other species in addition to hydrogen, the coverage is preferably between about 10% and about 90%, and more preferably between about 25% and about 75%. Composite material 10 illustrates such partial coverage. For coverage values less than about 10% the rate at which hydrogen can be sorbed drops substantially because the remaining uncoated surface of NEG particle 11 is passivated. At the other extreme, for coverage values higher than about 90%, the capacity to sorb gases other than hydrogen drops substantially because so much of the surface of NEG particle 11 is obstructed by palladium coating 12.

Palladium coating 12, 22 should have a thickness less than about 5 $\mu$m. Greater thicknesses slow the rate of hydrogen sorption without offering any particular advantages. Further, greater thicknesses consume larger quantities of palladium, which is very expensive.

Figure 3:
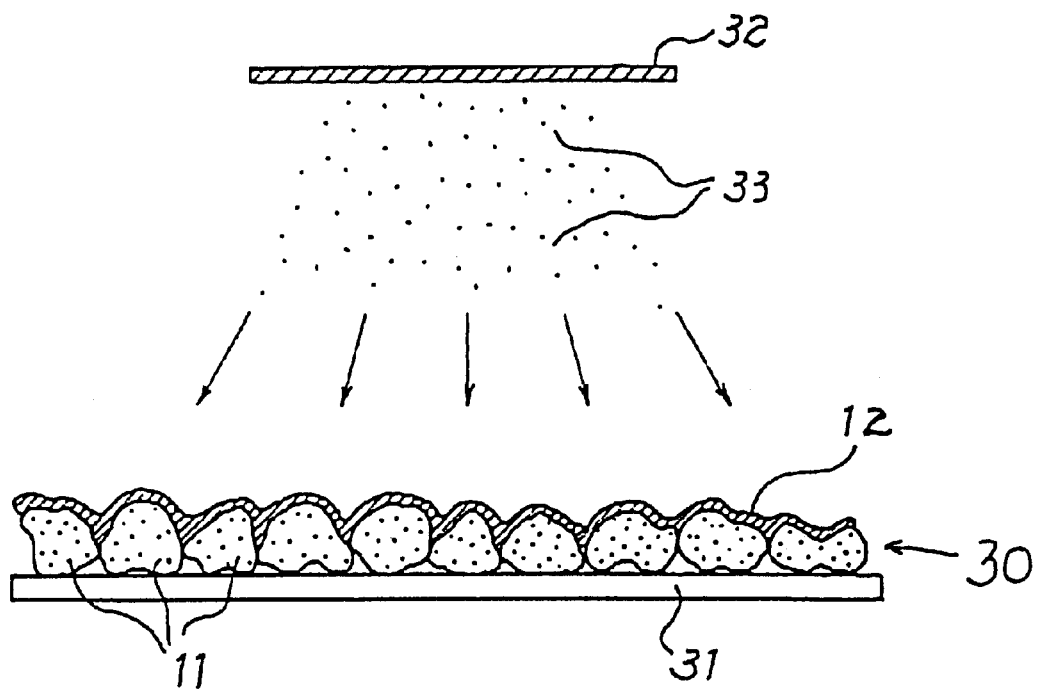
FIG. 3 shows a generalized method for coating NEG powders with palladium according to a embodiment of the present invention.

Palladium coating 12, 22 may be deposited onto NEG particle 11, 21 by various techniques. For coverages less than 100% evaporative or sputtering techniques can be employed. Both the evaporative and the sputtering techniques are illustrated generally by FIG. 3. For both types of deposition technique NEG particles 11 are placed within a chamber (not shown) maintained under vacuum, in the form of a thin powder bed 30 on a sample holder 31 beneath a palladium source 32. For evaporative depositions, the palladium source 32 can be a metal wire heated by passing current through it to boil off palladium. In sputtering depositions the palladium source 32 will be a target that is maintained at a negative potential and bombarded with positive ions, typically of argon or another inert element. Sputtering is preferable when palladium source 32 is a palladium-silver alloy. Clusters of palladium atoms 33 that are either evaporated or sputtered from source 32 deposit onto exposed portions of NEG particles 11 as palladium coating 12. As can be seen from FIG. 3, depositions onto a thin powder bed 30 will cover roughly half the surface of any exposed NEG particle 11. In order to increase the coverage of a NEG particle 11 beyond this point, and to ensure coverage of NEG particles 11 that may be initially partially or totally obscured, the thin powder bed 30 can be stirred, for example by vibrating the sample holder 31. Thus, coverages up to about 100% may be obtained.

Partial or total coverage can also be obtained by using chemical deposition from the vapor phase, commonly referred to as chemical vapor deposition (CVD). This technique involves evaporating, possibly at high temperature and/or at low pressure, a volatile or volatilizable precursor species that includes the element or compound to be deposited. The evaporation is carried out in a chamber containing the substrate onto which the precursor vapors condense. In the present context the substrate is a thin powder bed 30 of NEG particles 11, 21. After the precursor has been deposited it is decomposed by a thermal treatment. The decomposition leaves a coating 12, 22 of palladium metal, palladium oxide, or a palladium compound formed with one or more of the metals of the NEG particle 11, 21. Organometallic palladium compounds are preferable when using CVD to form a coating 12, 22.

Another technique suitable for obtaining coverages up to about 100% is a liquid phase impregnation process. According to this technique, NEG particles 21 are stirred into a solution 35 of a palladium compound in a suitable solvent maintained at a temperature between about 25° C. and about 50° C., as shown in FIG. 4. The solvent can be water, an alcohol, or a mixture thereof. Suitable palladium compounds include, for instance, the nitrate, $Pd(NO_3)_2$, the acetate, $Pd(OOC-CH_3)_2$, and salts of the tetraminic palladium complex, $[Pd(NH_3)_4]^{2+}$. The solution 35 is subsequently dried by evaporating the solvent, and then the resulting dry powder is treated at about 500° C. under vacuum for a period between about 5 and about 45 minutes. By this process the palladium salt which is left as a residue on the surfaces of the NEG particles 21 is converted into palladium oxide (in the case of the nitrate or the acetate) or into palladium metal in the case of salts of the tetraminic complex. Palladium oxide formed in this way can be subsequently at least partially reduced to metallic palladium by the NEG particle 21, as the getter material of the particle 21 has a strong affinity for oxygen.

By using CVD or the liquid phase impregnation process, a partial coating 12 of the NEG particles 11 can be achieved by using a limited quantity of the precursor. These quantities can be theoretically estimated, but are preferably obtained by empirical tests.

Regardless of the technique used to create the coating 12, the NEG particles 11 may be precharged with hydrogen (hydrogenated) before the coating 12 is deposited. The hydrogen sorbed by the NEG particle 11 during the precharging operation may then be released (dehydrogenated) during a subsequent thermal treatment. Such a subsequent thermal treatment can occur during the formation of the coating 12, for example, during the precursor decomposition phases of the CVD and liquid phase impregnation processes, or during the techniques of evaporation or sputtering. The release of hydrogen performs a surface cleaning of the exposed portion of the NEG particle 11, improving the sorption properties for gases other than hydrogen. For details relevant to the treatment of hydrogenation or dehydrogenation of NEG materials, see U.S. Pat. No. 4,839,085 and EP-B716,772.

Figure 5:
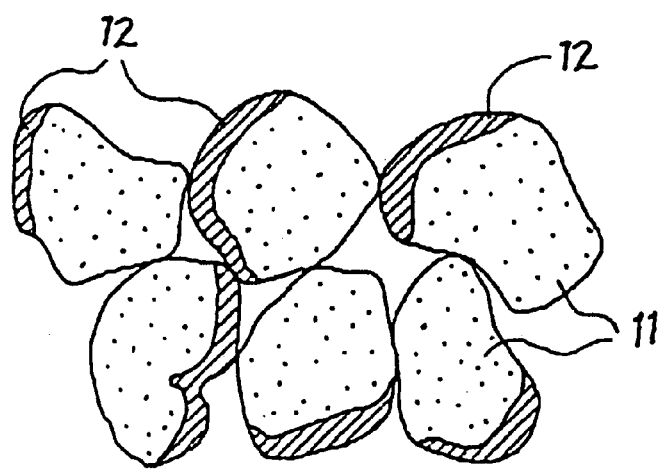
FIG. 5 shows a powder obtained according to the method of the present invention.

FIG. 5 illustrates a loose powder of composite material 10 as obtained according to the methods of the present invention. Powders of composite material 10, 20 may be pressed and sintered in order to form pellets, disks, or other useful shapes. Alternately, the powders of composite material 10, 20 can be pressed into a container open at one end, for instance through compression with a suitable punch. Powders of composite material 10, 20 may also be deposited onto a generally planar substrate using techniques such as cold rolling or screen-printing. Formation of pellets, the use of containers, and cold lamination are well known in the field of powder metallurgy, and the details of the screen-printing technique as applied to getter materials are described in U.S. Pat. No. 5,882,727.

The invention will be further illustrated by means of the following examples.

EXAMPLE 1

This example exemplifies the preparation of a composite material 20 of the present invention:

10 grams of St 707® alloy having a particle size between 20 $\mu$m and 128 $\mu$m are placed in an aqueous solution of $Pd(NO_3)_2$, containing 0.43g of the salt. The ratio of palladium to St 707® alloy in the solution is 2% by weight. The water is evaporated by heating under a partial vacuum while the solution is stirred by using a rotating evaporator. The dry residue is subjected to a thermal treatment at 500° C. under vacuum.

The material thus prepared represents Sample 1.

EXAMPLE 2

This test exemplifies the functionality of a composite material 20 of the present invention:

1 gram of Sample 1 is activated by treating it at 500° C. for 30 minutes. Subsequently, it is exposed to CO gas at a pressure of $1.3 \times 10^{-3}$ mbar for 5 minutes and then to hydrogen gas at a pressure of $2.7 \times 10^{-3}$ mbar. The sorption rate is about 60 ml of hydrogen per second.

EXAMPLE 3

The test of Example 2 is repeated with 1 gram of alloy St 707® not coated with palladium. The sorption velocity is about 20 ml of hydrogen per second.

From the comparison of tests 2 and 3 it may be inferred that the composite material 20 of the present invention has a hydrogen sorption velocity approximately three times that of the same known NEG material without a palladium coating 22.

Although the foregoing invention has been described in some detail for purposes of clarity of understanding, it will be apparent that certain changes and modifications may be practiced within the scope of the appended claims. Accordingly, the present embodiments are to be considered illustrative and not restrictive, and the invention is not to be limited to the details given herein, but may be modified within the scope and equivalents of the appended claims.

What is claimed is:

1. A composite material capable of continuously sorbing hydrogen, said composite material comprising:

a plurality of particles of a non-evaporable getter material, said particles being coated over at least about 10% of their surfaces with a coating of one or more species selected from the group consisting of palladium, palladium oxide, palladium-silver alloys containing up to about 30% atomic percent silver, and compounds of palladium and said getter material.

2. A composite material according to claim 1, wherein between about 10% and about 90% of said particles' surfaces are coated with said coating.

3. A composite material according to claim 1 or 2, wherein said non-evaporable getter material is selected from the group consisting of:

Zr, Ti, Nb, Ta, and V metals;

Zr alloyed with either Ti, Cr, Mn, Fe, Co, Ni, Al, Cu, Sn, Si, Y, La, any of the rare earth elements, or mixtures thereof;

Ti alloyed with either Zr, Cr, Mn, Fe, Co, Ni, Al, Cu, Sn, Si, Y, La, any of the rare earth elements, or mixtures thereof, and any mixture of the aforementioned metals and alloys.

4. A composite material according to claim 3, wherein said non-evaporable getter material is selected from the group consisting of Ti—V alloys, Zr—V alloys, Zr—Al alloys, Zr—Fe alloys, Zr—Ni alloys, Ti—V—Mn alloys, Zr—Mn—Fe alloys, Zr—V—Fe alloys, Zr—Ni—A—M alloys, and Zr—Co—A alloys, where A indicates Y, La, any of the rare earth elements, or mixtures thereof, and M indicates Co, Cu, Fe, Al, Sn, Ti, Si, or mixtures thereof.

5. A composite material according to claim 2, wherein between about 25% and about 75% of said particles' surfaces are coated with said coating.

6. A composite material according to claim 1 or 2, wherein a thickness of said coating is less than about 5 $\mu$m.

7. A composite material according to claim 1 or 2, wherein said particles of said non-evaporable getter material have a size less than about 500 $\mu$m.

8. A composite material according to claim 7, wherein said particle size is between about 20 $\mu$m and about 125 $\mu$m.

9. A pressed and sintered pellet of a composite material capable of continuously sorbing hydrogen, comprising:

a plurality of particles of a non-evaporable getter material, said particles being coated over at least about 10% of their surfaces with a coating of one or more species selected from the group consisting of palladium, palladium oxide, palladium-silver alloys containing up to about 30% atomic percent silver, and compounds of palladium and said getter material.

* * * * *